United States Patent
Line

(10) Patent No.: US 8,474,913 B2
(45) Date of Patent: Jul. 2, 2013

(54) STRUCTURAL HEAD RESTRAINT GUIDE SLEEVE

(75) Inventor: Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 13/100,482

(22) Filed: May 4, 2011

(65) Prior Publication Data

US 2012/0280552 A1    Nov. 8, 2012

(51) Int. Cl.
*B60R 22/28*    (2006.01)
*A47C 7/36*    (2006.01)

(52) U.S. Cl.
USPC .......................................................... 297/391

(58) Field of Classification Search
USPC ...................... 297/410, 463.1, 391
See application file for complete search history.

(56) References Cited

U.S. PATENT DOCUMENTS

| 3,592,508 | A | | 7/1971 | Druselkis | |
| 4,545,618 | A | * | 10/1985 | Kitamura | 297/410 |
| D282,522 | S | * | 2/1986 | Meeks | D8/71 |
| 5,080,437 | A | | 1/1992 | Pesta et al. | |
| 5,667,276 | A | * | 9/1997 | Connelly et al. | 297/410 |
| 6,062,645 | A | * | 5/2000 | Russell | 297/410 |
| 6,454,356 | B1 | * | 9/2002 | Yamada | 297/410 |
| 2010/0156152 | A1 | | 6/2010 | Chen et al. | |

* cited by examiner

*Primary Examiner* — Milton Nelson, Jr.
(74) *Attorney, Agent, or Firm* — Vichit Chea; Price Heneveld LLP

(57) ABSTRACT

A guide sleeve for a vehicle seat having a body portion adapted for insertion into a horizontal support of a vehicle seating assembly. The body portion includes a plurality of engagement members that extend radially outward from a center of the body portion.

16 Claims, 6 Drawing Sheets

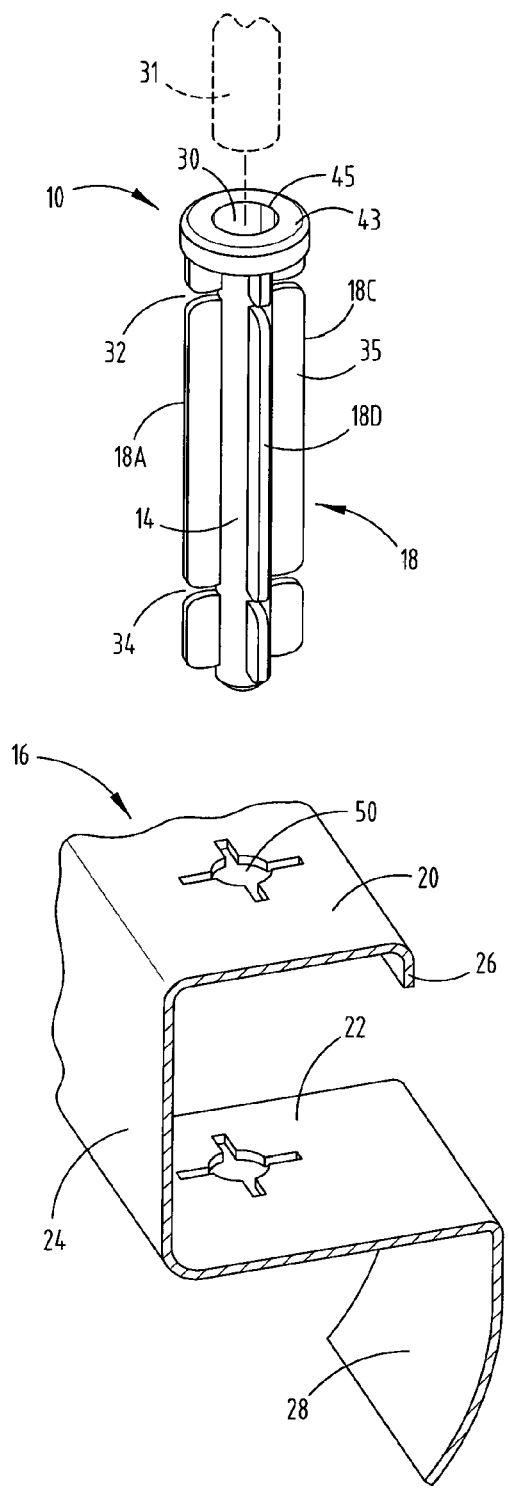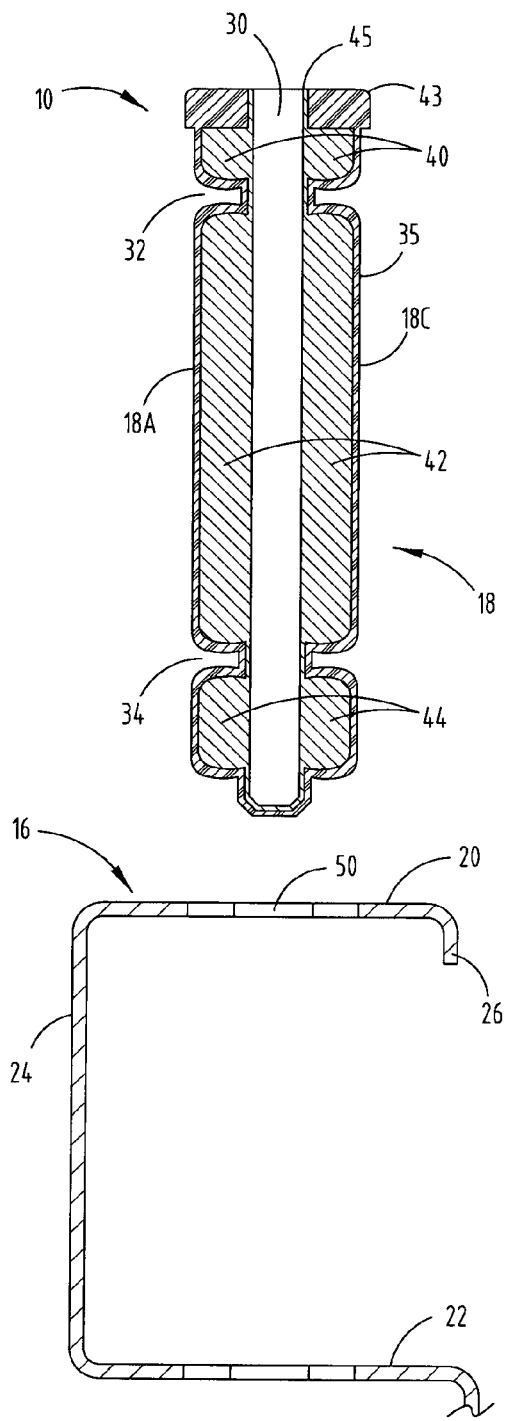
FIG. 2A
FIG. 2B

STRUCTURAL HEAD RESTRAINT GUIDE SLEEVE

FIELD OF THE INVENTION

The present invention generally relates to a guide sleeve, and more specifically to a head restraint guide sleeve that provides structural support to a seat frame and can be easily installed during the manufacturing process.

BACKGROUND OF THE PRESENT INVENTION

Guide sleeves are frequently installed in vehicle seats and used to receive and secure support posts that extend from headrest assemblies.

SUMMARY OF THE PRESENT INVENTION

One aspect of the present invention includes a guide sleeve for a vehicle seat assembly having a body portion adapted for insertion into a horizontal support of the vehicle seat assembly. The body portion includes a plurality of engagement members that extend radially outward from a center of the body portion.

Another aspect of the present invention includes a vehicle seating assembly having a seat frame including at least one guide sleeve receiving aperture. A guide sleeve is disposed in the guide sleeve receiving aperture and includes a plurality of engagement members extending radially from a body portion thereof. The guide sleeve is adapted for rotational engagement with the seat frame and provides structural support to load forces applied to the seat back.

Another aspect of the present invention includes a vehicle seating assembly including a seat frame and a guide sleeve receiving aperture in an upper portion thereof. A guide sleeve is disposed in the guide sleeve receiving aperture. The guide sleeve includes a plurality of outwardly-extending engagement members.

These and other aspects, objects, and features of the present invention will be understood and appreciated by those skilled in the art upon studying the following specification, claims, and appended drawings.

BRIEF DESCRIPTION OF THE DRAWINGS

FIG. 2 is a side elevational cross-sectional view of the guide sleeve and the horizontal support of the guide sleeve;

DETAILED DESCRIPTION OF EMBODIMENTS

Figures 1A, 1B:
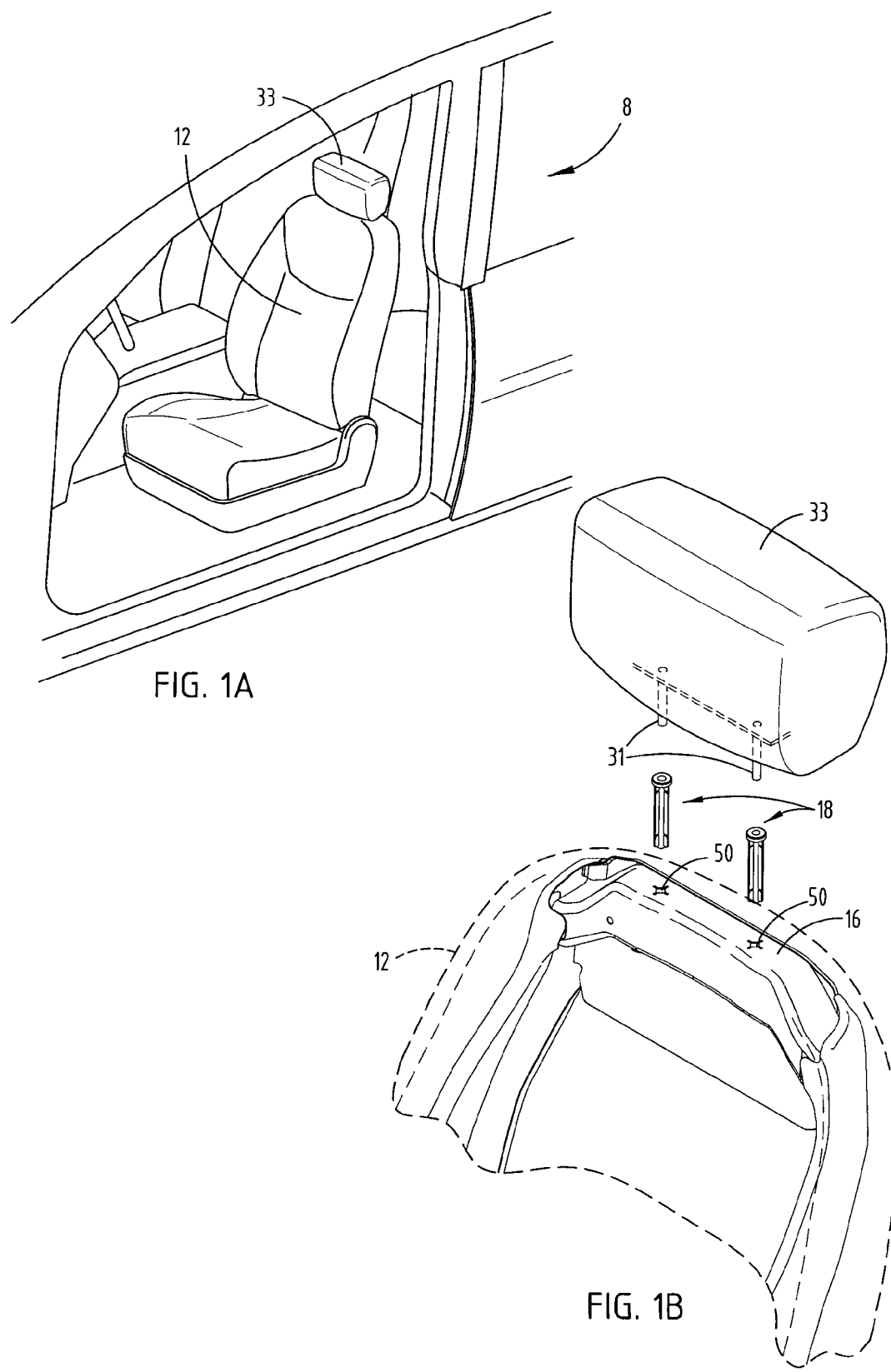
FIG. 1A is a front perspective view of a vehicle seat assembly with a guide sleeve installed.
FIG. 1B is a front perspective view of a guide sleeve and a horizontal support of the vehicle seat assembly of FIG. 1A.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1A-2B, reference numeral 8 generally designates a vehicle that includes a guide sleeve 10 for a vehicle seat assembly 12 having a body portion 14 adapted for insertion into a horizontal support 16 of the vehicle seat assembly 12. The body portion 14 includes a plurality of equidistantly spaced engagement members 18 that extend radially outward from the body portion 14.

In the embodiment illustrated in FIGS. 2A and 2B, the horizontal support 16 of the vehicle seat assembly 12 includes a top flange 20 and a bottom flange 22 spaced apart by a web 24. The top flange 20 includes a rearward lip 26, while the bottom flange 22 includes a support wall 28. The horizontal support 16 provides structural support to the vehicle seat assembly 12. The horizontal support 16 is generally constructed from a strong metal, such as steel, or a strong polymer.

Referring again to FIGS. 1A-2, the engagement members 18 of the guide sleeve 10 are generally equidistantly spaced about the body portion 14 of the guide sleeve 10. The guide sleeve 10 is a generally tubular member, and defines an inner aperture 30 adapted to receive headrest posts 31 that extend downwardly from a headrest 33. However, it is generally contemplated that the body portion 14 could include a variety of polygonal constructions. More specifically, instead of being tubular, the body portion 14 could be square, pentagonal, hexagonal, octagonal, etc. The body portion 14 is constructed from a strong polymer or metal that has some load-bearing capacity. The body portion 14 and engagement members 18 may be coated with a material 35 having a high coefficient of friction, such as rubber. Alternatively, the entire body portion 14 may be made from a frictional material that also has strong structural properties.

In the illustrated embodiment, there is a first engagement member 18A, a second engagement member 18B, a third engagement member 18C, and a fourth engagement member 18D, which are collectively referred to as engagement members 18. It will be generally understood that there could be greater or less than four engagement members 18 disposed on the guide sleeve 10. The engagement members 18 include a first seat frame receiving channel 32 disposed at an upper portion of the engagement members 18 and a second seat frame receiving channel 34 disposed at a lower portion of the engagement members 18. Consequently, each engagement member 18A, 18B, 18C, and 18D includes a top portion 40, an intermediate portion 42, and a bottom portion 44. Each of the top portion 40, intermediate portion 42, and bottom portion 44 include rounded engagement edges that assist in facilitating installation of the guide sleeve 10 during the manufacturing process. The top portion 40 of each engagement member 18A, 18B, 18C, and 18D abut an upper support collar 43 that surrounds a top opening 45 in communication with the inner aperture 30.

Figure 3A:
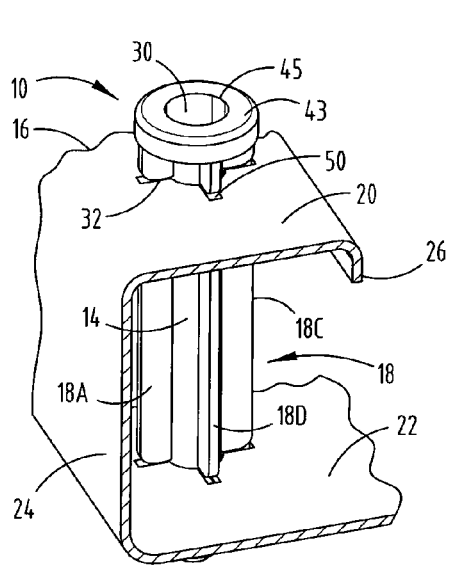
FIG. 3A is a front perspective view of the body portion inserted into a horizontal support.
Figure 3B:
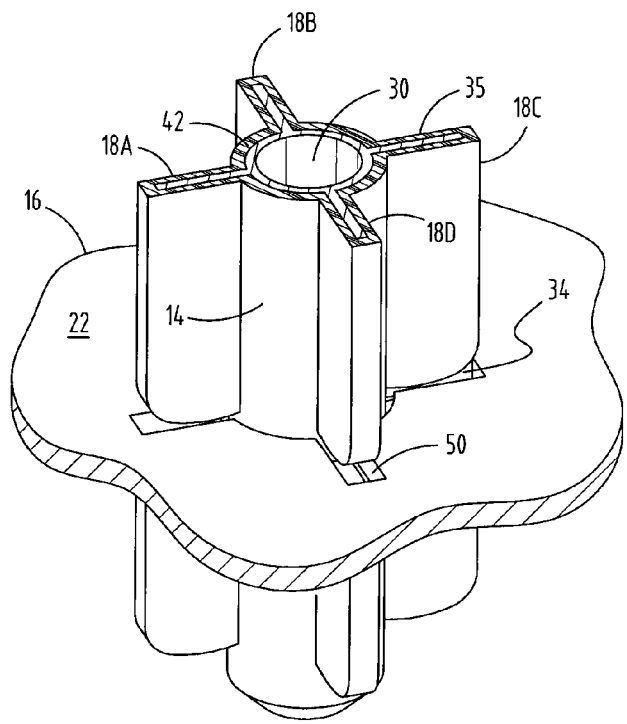
FIG. 3B is a front perspective cross-sectional view of the guide sleeve and horizontal support of FIG. 3A during installation.
Figure 3C:
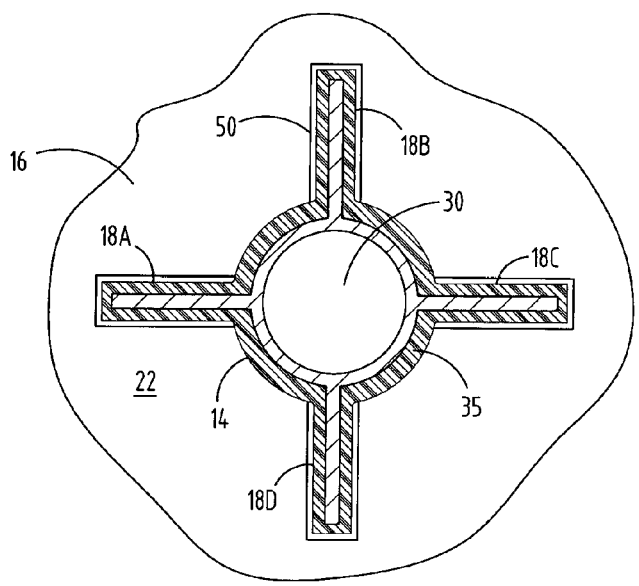
FIG. 3C is a top elevational cross-sectional view of the guide sleeve of FIG. 3A during installation.

Referring now to FIGS. 3A-3C, the guide sleeve 10 includes a generally X-shaped cross-section (FIG. 3C). The horizontal support 16 of the vehicle seat assembly 12 defines a guide receiving aperture 50 that includes a complementary X-shaped construction, thereby allowing insertion of the guide sleeve 10 into the guide receiving aperture 50 during the manufacturing process. In the event that the guide sleeve 10 included a different construction having more or less engagement members 18, the guide receiving aperture 50 would include a complementary construction to receive the guide sleeve 10. For the purposes of this disclosure and for example, the guide sleeve 10 having four engagement members 18 will be illustrated. The upper support collar 43 of the guide sleeve 10 is adapted for abutment with a top portion of the vehicle seat assembly 12.

Figure 4:
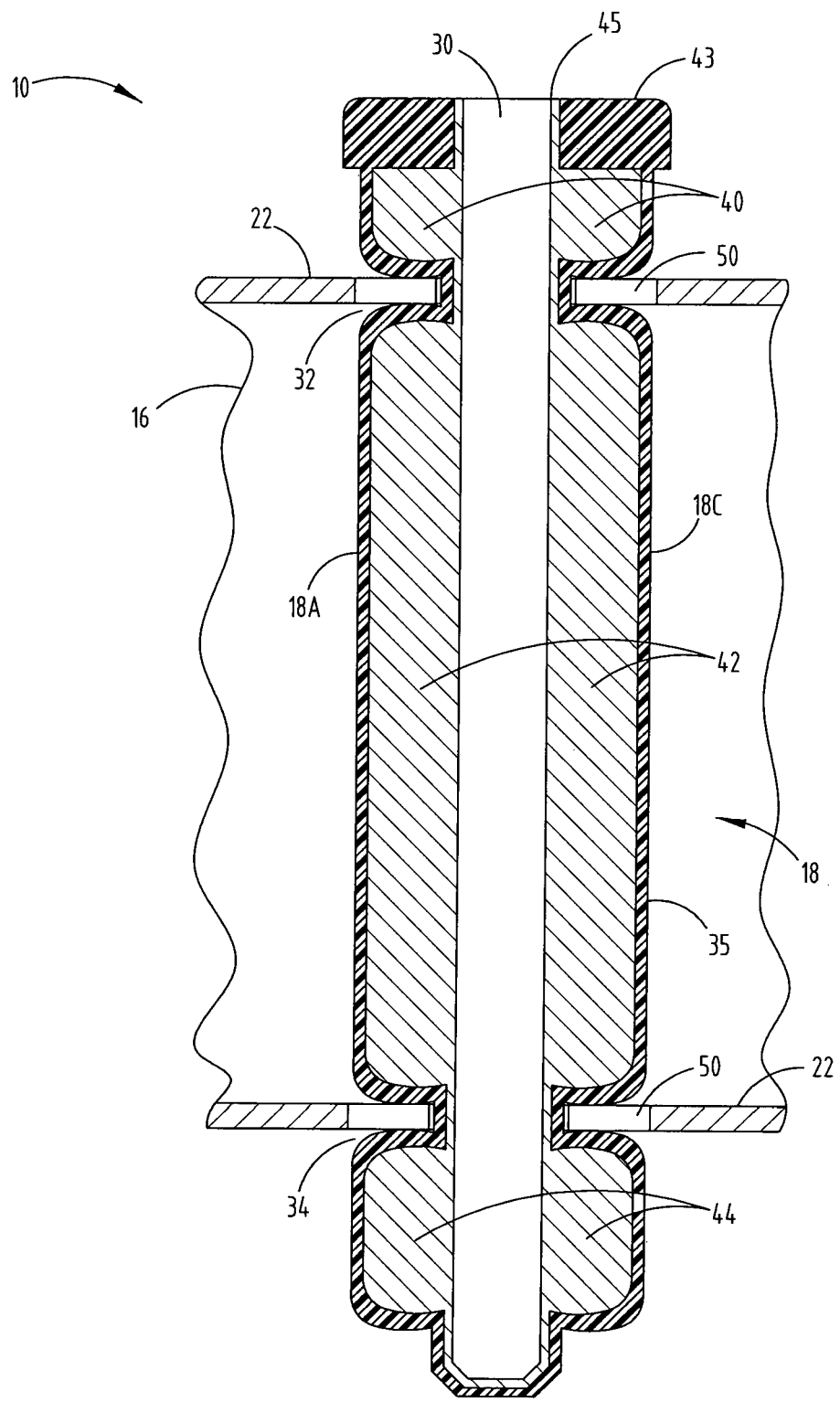
FIG. 4 is a front elevational cross-sectional view of the guide sleeve inserted into a horizontal support.
Figure 5A:
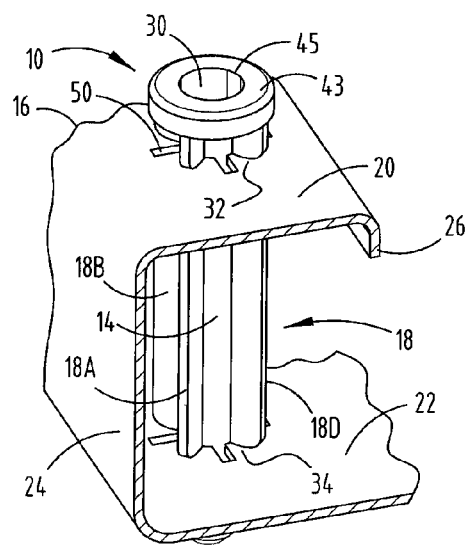
FIG. 5A is a front perspective view of the body portion installed in a horizontal support.
Figure 5B:
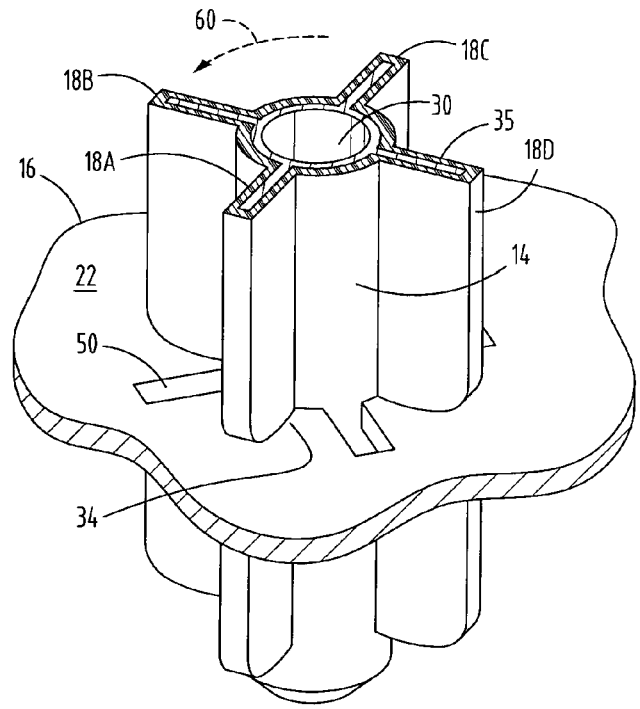
FIG. 5B is a front perspective cross-sectional view of the guide sleeve of FIG. 5A after installation.
Figure 5C:
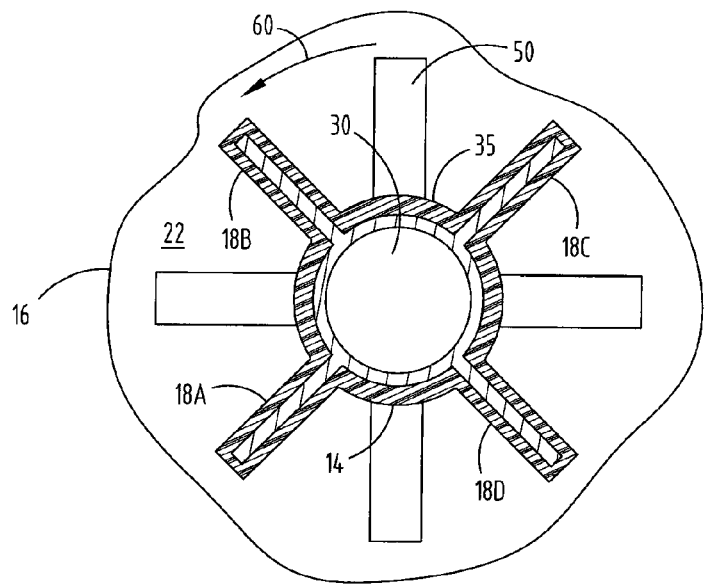
FIG. 5C is a top cross-sectional view of the guide sleeve of FIG. 5A after installation.

Referring again to FIGS. 3A-3C and also FIG. 4, during installation, the first seat frame receiving channel 32 is designed to align with the top flange 20, while the second seat frame receiving channel 34 is designed to align with the bottom flange 22. When the guide sleeve 10 is fully inserted, but not yet fully installed, into the horizontal support 16 of the vehicle seat assembly 12, the first and second seat frame receiving channels 32, 34 are aligned with the upper and lower horizontal supports 16 of the vehicle seat assembly 12. A width $W_1$ of the first seat frame receiving channel 32 is the same size or slightly larger than a thickness $T_1$ of the top flange 20 of the horizontal support 16. Likewise, a width $W_2$ of the second seat frame receiving channel 34 is the same size or slightly larger than a thickness $T_2$ of the bottom flange 22 of the horizontal support 16.

When the top and bottom flanges 20, 22 of the horizontal support 16 are aligned with the first and second seat frame receiving channels 32, 34, respectively, the entire guide sleeve 10 can be rotated in the direction of arrow 60, such that the top portion 40 of the engagement members 18 and the intermediate portion 42 of the engagement members 18, which define the first seat frame receiving channel 32, frictionally engage the top flange 20. At the same time, the intermediate portion 42 and the bottom portion 44 of the engagement members 18, which define the second seat frame receiving channel 34, frictionally engage the bottom flange 22. In the illustrated embodiment, the guide sleeve 10 is rotated approximately 45 degrees, such that the first seat frame receiving channel 32 and the second seat frame receiving channel 34 are in secure frictional engagement with the top flange 20 and the bottom flange 22, respectively.

Traditional designs for guide sleeves are connected to the horizontal support 16 but provide no additional structural support to the vehicle seat assembly 12 generally. Rather, they act to relay impact forces from an occupant during a collision to the vehicle seat assembly 12, which must be robust enough to withstand the force.

Figure 6:
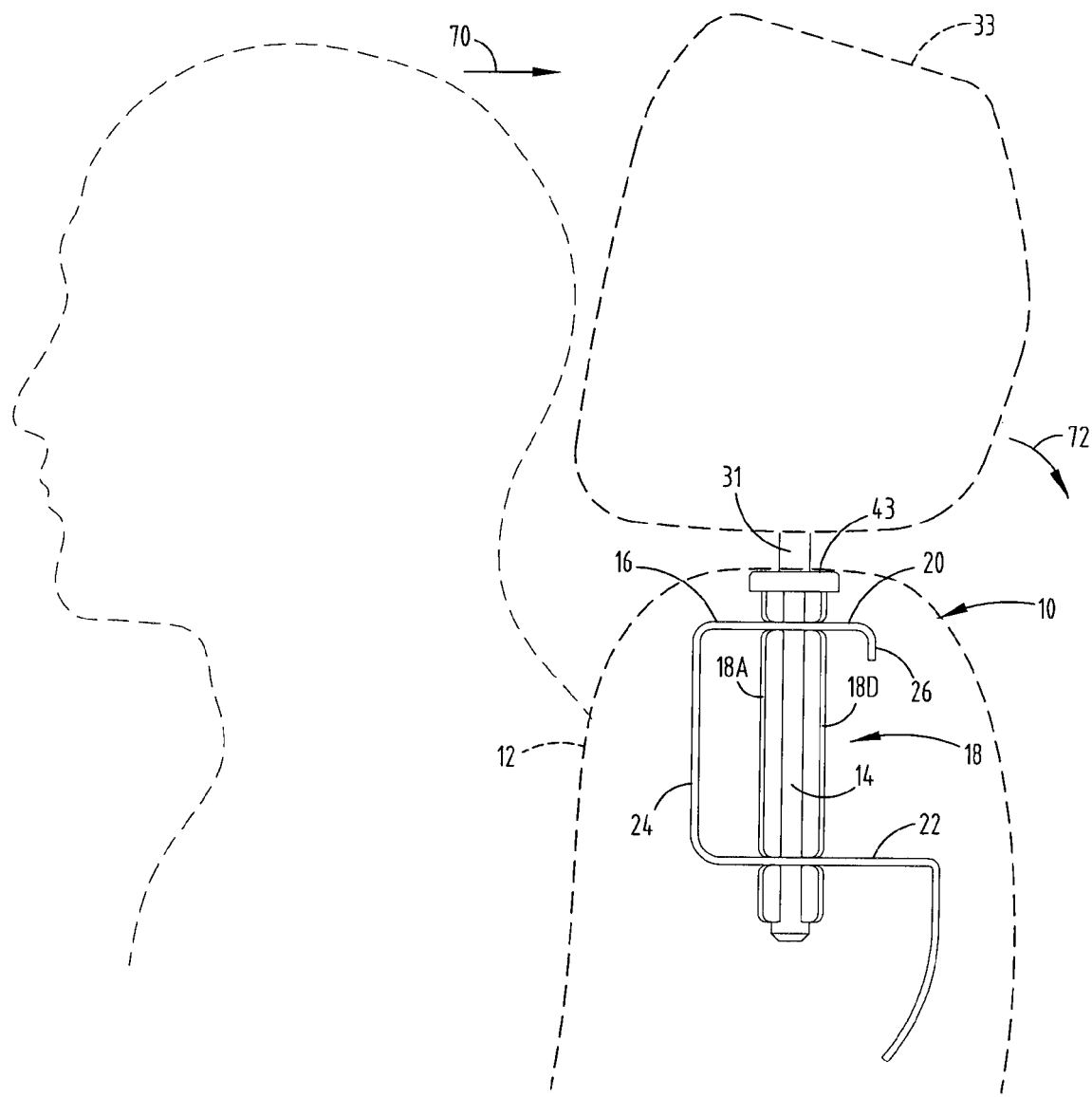
FIG. 6 is a side elevational view of the guide sleeve during a collision event.

Referring now to FIG. 6, the guide sleeve is designed to provide structural support to the horizontal support 16 of the vehicle seat assembly 12 during a collision event. For example, in the event of a forward crash, the head of an occupant will apply a force in the direction of arrow 70 to the head rest 33. The force is transferred down the headrest posts 31, into the guide sleeves 10 and into the horizontal support 16. The engagement members 18, and specifically, the first seat frame receiving channel 32 and the second seat frame receiving channel 34, assist in maintaining the relative positions of the top flange 20 and the bottom flange 22 when the headrest 33 transfers a force resulting from a collision to the guide sleeves. Consequently, the structural integrity of the horizontal support 16 and the vehicle seat assembly 12 is increased such that the horizontal support 16 and the vehicle seat assembly 12 can withstand a higher impact load resulting from a collision event.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A guide sleeve for a vehicle seat assembly comprising:
   a body portion adapted for insertion into a horizontal support of the vehicle seat assembly;
   a plurality of elongate engagement members that are parallel with a longitudinal extent of the body portion and that extend radially outward from a center of the body portion, the engagement members being equidistantly spaced about the perimeter of the body portion, and including at least one seat frame receiving channel.

2. The guide sleeve of claim 1, wherein the guide sleeve further comprises:
   an upper support collar.

3. The guide sleeve of claim 1, wherein the guide sleeve is positioned between and connects with first and second upper seat frame flanges.

4. The guide sleeve of claim 1, wherein each engagement member includes a rounded engagement edge.

5. A vehicle seating assembly comprising:
   a seat frame having at least one guide sleeve receiving aperture;
   a guide sleeve disposed in the guide sleeve receiving aperture and including a body portion;
   a plurality of elongate engagement members extending radially from and equidistantly spaced about a perimeter of the body portion, wherein the guide sleeve is adapted for rotational engagement with the seat frame and provides structural support to load forces applied to the seat frame, and wherein the engagement members are covered with a rubber material.

6. The vehicle seating assembly of claim 5, wherein each engagement member includes a rounded engagement edge.

7. The vehicle seating assembly of claim 5, wherein the guide sleeve is secured inside the guide receiving aperture without the aid of fasteners.

8. The vehicle seating assembly of claim 5, wherein the guide sleeve further comprises:
   an upper support collar.

9. The vehicle seating assembly of claim 5, wherein the guide sleeve is positioned between and connects with first and second upper seat frame flanges.

10. A vehicle seating assembly comprising:
    a seat frame;
    a guide sleeve receiving aperture in an upper portion thereof; and
    a guide sleeve disposed in the guide sleeve receiving aperture;
    a plurality of outwardly-extending engagement members spaced equidistantly about a perimeter of the guide sleeve and defining upper and lower seat frame receiving channels that receive a portion of the seat frame.

11. The vehicle seating assembly of claim 10, wherein each engagement member includes a rounded engagement edge.

12. The vehicle seating assembly of claim 10, wherein the guide sleeve is secured inside the guide receiving aperture without the aid of fasteners.

13. The vehicle seating assembly of claim 10, wherein the guide sleeve further comprises:
an upper support collar.

14. The vehicle seating assembly of claim 10, wherein the guide sleeve is positioned between and connects with first and second upper seat frame flanges.

15. The vehicle seating assembly of claim 10, wherein the guide sleeve includes first and second opposing outwardly-extending engagement members.

16. The vehicle seating assembly of claim 10, wherein the engagement members are covered with a rubber material.

* * * * *